United States Patent [19]

McIntosh, Jr.

[11] Patent Number: 4,864,153

[45] Date of Patent: Sep. 5, 1989

[54] DEVICE FOR CLOSING WINDOWS IN A VEHICLE

[76] Inventor: Bennie McIntosh, Jr., P.O. Box 431611, Los Angeles, Calif. 90043

[21] Appl. No.: 81,011

[22] Filed: Aug. 3, 1987

[51] Int. Cl.⁴ .......................... H02J 1/00; H02P 7/68

[52] U.S. Cl. .................................. 307/10.1; 318/280; 318/282

[58] Field of Search ................ 307/10 R, 9; 318/282, 318/285, 280, 283

[56] References Cited

U.S. PATENT DOCUMENTS 4,427,929 1/1984 Andrei-Alexandru et al. .... 318/282

4,450,390 5/1984 Andrei-Alexandru et al. .... 318/282

4,683,975 8/1987 Booth et al. .................... 318/282 X 4,733,145 3/1988 Ohashi et al. ................ 307/10 R X

*Primary Examiner*—William M. Shoop, Jr.

*Assistant Examiner*—Sharon D. Logan

*Attorney, Agent, or Firm*—Julius L. Rubinstein

[57] ABSTRACT

An automobile provided with electrically operated windows and electric door lock is provided with a relay circuit which is connected to both the electric door lock and the push button on the car door handle, which works in such a way that when either the electric door lock switch is actuated, or the push button on the external car door handle is pressed, all the windows in the car simultaneously move upward and close.

7 Claims, 1 Drawing Sheet

DEVICE FOR CLOSING WINDOWS IN A VEHICLE

This invention relates to a device for closing windows in a vehicle provided with power operated windows and more particularly to a device for automatically closing all the windows in the vehicle.

BACKGROUND AND BRIEF SUMMARY

Most modern vehicles are provided with electrically operated windows. Typically, each of the windows are controlled by a switch located beneath the vehicle window which when actuated raises or lowers the window. In addition, a plurality of switches are typically positioned on or by the door adjacent to the driver's seat so that the driver may raise or lower any of the windows in the vehicle individually by operating the proper switch.

In addition modern vehicles are typically provided with electrically operated door locks. The switch for controlling these door locks is usually positioned on or near the vehicle door by the driver. In this way, when the driver leaves his vehicle, he can actuate the vehicle door switch, and all the doors in the vehicle will be locked simultaneously.

The problem with this arrangement, is that in existing the—vehicle and actuating the electrical vehicle door switch to lock the vehicle doors, the driver often fails to notice that some of the vehicle windows are open. Consequently, access to the interior of the vehicle is easy, and any valuables left in the vehicle can be stolen. This requires the driver to reopen the door so that he can operate the window operating switches to close all the windows. This can be a lot of trouble, particularly if the door is locked, and the keys are in the drivers pocket, and he is carrying some packages.

Additional art discovered in this case are the patents to Booth 4,683,975, Ohashi et al, No. 4,733,145, Andrei No. 4,450,390, and Andrei 4,427,959. These patents relate to door closing and window closing devices, but they are not concerned with the problem applicant is concerned with moreover they are complicated and expensive to build and service. In contrast, another important object of this invention is to provide an in expensive circuit for manually closing the windows of a vehicle independent of the ignition switch from outside the vehicle.

Of course, it would not be too difficult to construct a time delay mechanism which automatically closes windows of vehicle after the driver has locked the ignition and the doors and has and exited the vehicle. But this could be dangerous. On some occasions, during hot weather, a child might be left in the car with the windows open. If the driver forgot about the automatic window closing feature, the windows could close automatically with fatal results. For this reason, devices which automatically close the windows of a vehicle after a period of time are undesirable.

What is needed and what constitutes an important object of this invention is to provide a manually operated mechanism independent of the ignition switch n the case of a motor vehicle or independent of an electric door switch, in the case of a trailer or motor home, for closing all the vehicle windows from outside the car if the driver finds he has inadvertently left some of the windows partially open and to provide such a mechanism comprises an important object of this invention.

Still another problem with exiting vehicles which employ electrically powered door locks and windows, involves security, in that on occasion an elderly or frail woman or man may be driving a motor vehicle and carrying valuables alone with the windows open. It would be a great comfort to the driver if, on the approach of threatening persons he could lock all the doors and windows by actuating a single switch, and to provide a mechanism for doing this comprises still another object of this invention.

Since the mechanism for closing all the windows in a vehicle are independent of the ignition switch, it is clear that the principles of this invention are applicable to motor homes and trailers.

These and other objects of this invention will become more apparent when better understood in the light of the accompanying specification and drawings wherein.

Figure 1:
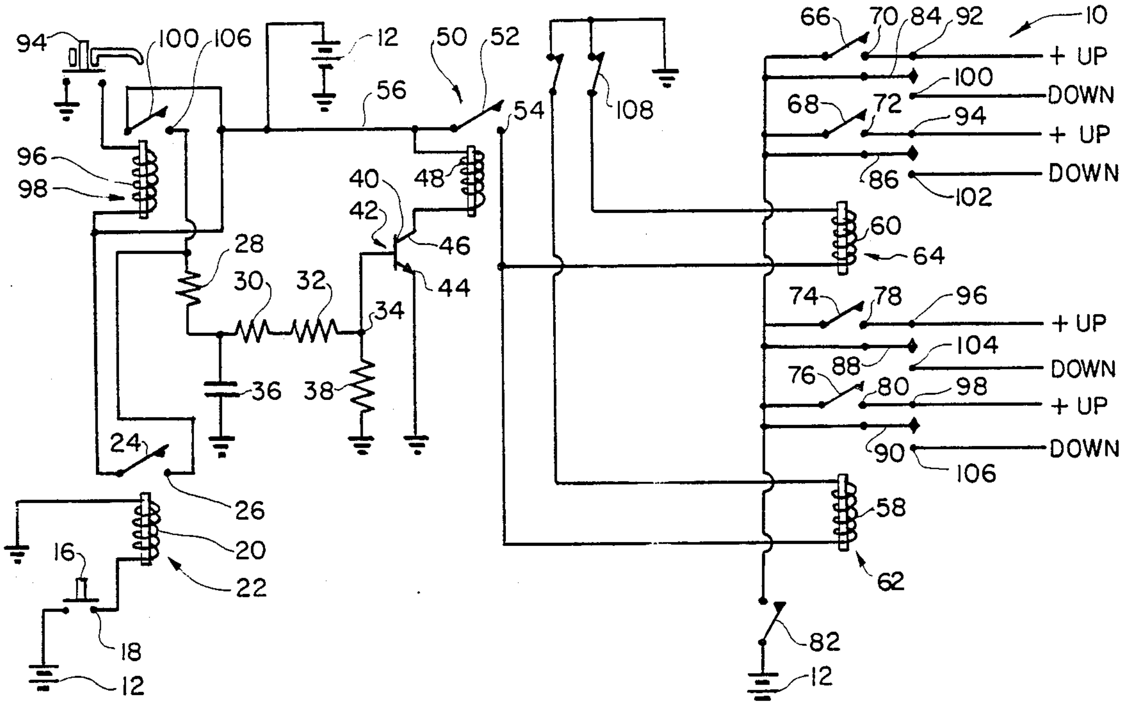
FIG. 1 is a circuit diagram of an electrical circuit mounted in a motor vehicle which is designed to close all electrically powered motor vehicle windows whenever the electrical car door switch is actuated, or, in the alternative, the electrical circuit closes all the electrically powered motor vehicle windows from outside the motor vehicle, whenever the button on the car door handle is pressed.

Referring now to FIG. 1 of the drawing, the electrical circuit indicated generally by the reference numeral 10 is powered by the vehicle battery or some other suitable device indicated generally by the reference numeral 12. The vehicle door 14 has a conventional electrical door lock controlled by an electric door lock switch mounted in the vehicle and indicated generally by the reference numeral 16. When the door lock switch 16 is moved to terminal 18, current flows through the relay coil 20 to ground, actuating the relay 22 causing the relay blade 24 to make electrical contact with terminal 26.

Terminal 26 does two things. First it is connected to the electrical lock on the door 14 and locks the door by a conventional electrical mechanism and electrical lock, (not shown). In addition, the positive voltage from the battery 12 goes through the 10 ohm resistor 28 and through the 1 K resistor 30 which is connected in series with the 27K resistor 32 to terminal 34. It is noted that the junction between the 10 ohm resistor 28 and the 1 K resistor 30 is connected to ground through a 25 volt 1000 uf capacitor 36. Terminal 34 is connected to ground through a 100 K resistor 38, as shown.

Terminal 34 is also connected to the base 40 of a RS 2009 NPN transistor 42. The emitter 44 of the transistor is grounded, but the collector 46 of the transistor is connected to the coil 48 of relay 50. Relay 50 has a blade 52 and when the relay is actuated the blade 52 engages terminal 54.

To this point, whenever the door lock switch 16 is moved to terminal 18, relay 22 is actuated turning on transistor 42 which in turn energizes relay 48 connecting the blade 52 of the relay to terminal 54.

Blade 52 of the relay 50 is connected to the positive side of the battery by means of the wire 56 so when relay 42 is actuated, the positive side of the battery is connected to terminal 54. Terminal 54 is connected to the coils 58 and 60 in relays 62 and 64.

Relay 64 includes blades 66 and 68 which constitutes one of two window control switches connected to said electric power source and to said electric motors in the window (not shown). When relay 64 is actuated these blades move and contact terminals 70, and 72 which serve as one of the window control switches. Terminals 70 and 72 are connected to the positive side of the battery 12 through the main control switch 82 and when any of the blades 66 or 68, engage terminals 70 or 72. The circuit is completed through the electric window motors in the front doors, (not shown), and the windows are moved up because terminals 70 and 72 are connected to the window motors so the motors rotate in a direction which raises the windows.

In the case of a four door motor vehicle, relay 62 may be added. This relay includes blades 74 and 76. When relay 62 is actuated these blades move and contact terminals 78 and 80. Terminals 78 and 80 are also connected to the positive side of the battery 12 through the main control switch 82, and when the blades 74 and 76 engage terminals 78 or 80, the circuit is completed through the rear door window motors so the motors rotate in a direction which raises the rear door windows.

Figure 2:
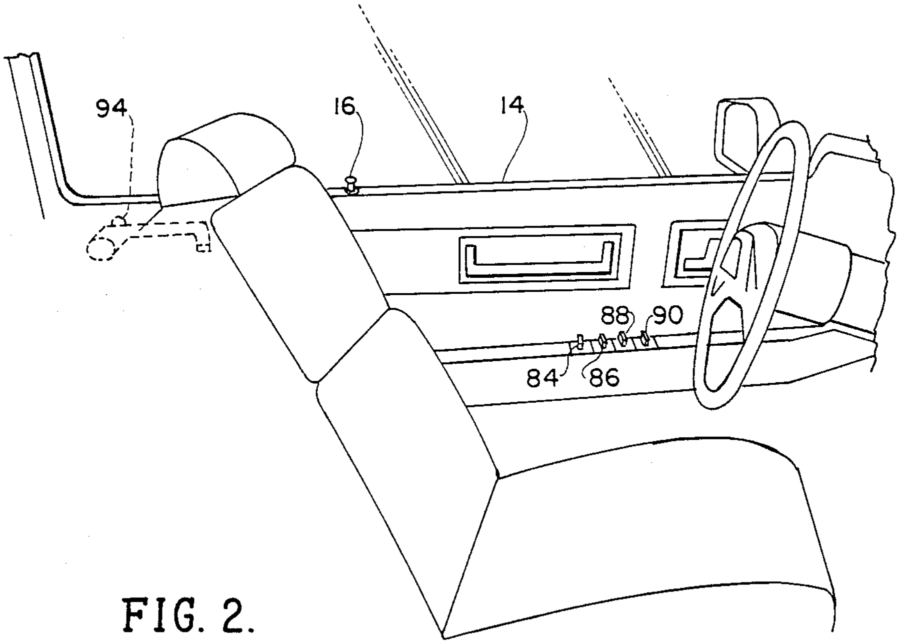
FIG. 2 is a phantom perspective of the interior of a motor vehicle disclosing the car door lock switch mounted inside the motor vehicle by the car door, and disclosing in phantom lines the car door handle on the outside of the car door and the car door button, which when pressed automatically closes all the electrically operated car door.

Each window in the motor vehicle is provided with the second manually controlled window operating blades or switches 86, 88 and 90 as shown in FIG. 2. These switches are connected to the window motors so they bypass relays 62 and 64 in the first window control switch. Each of these window switches have three pole positions controlled by blades 84, 86, and 88. When the blades 84, 86, and 88 are manually moved to the window up pole positions 92, 94, 96, or 98, the movably mounted windows actuated by the movement of said blades, rise to a closed position. When any of the switches 84, 86, 88, and 90 are moved to engage terminals 100, 102, 104, and 106, the windows move down, because these terminals are connected to the electric motors through a conventional reversing circuit (not shown), so the polarity of the motors is reversed and the window motors rotate in an opposite direction. When the switches are left in the third unnumbered pole position, as shown in FIG. 1, they no effect on the windows.

Micro switches, or other means, (not shown) are mounted in the window frame to cut off the ground to the relays by means (not shown), or to cause the control switch 82 to open by means of another relay (not shown when the door windows are raised or lowered to the highest or lowest position in the door frame. This deenergizes the relays 62 and 64 causing the blades 66, 68, 74 and 76 to disengage from terminals 70, 72. 78 and 80 thereby stopping the window motors and preventing damage to the windows and the door frames in the doors.

To this point it is seen that when the door lock switch 16 is actuated so it engages terminal 18, relays 22, 50, 62 and 64 are energized, operating all the windows in the motor vehicle so they move upward and close simultaneously.

The main control switch 82 is connected between the relay blades 76, 78, 80, and 82 and the battery and when actuated either by operating a manually controlled switch, or through a relay switch (not shown), connected, for example to relay 20 controlled by the door lock switch 16, power to the electric window closing mechanism is cut off. As seen, switch 82 is connected to the battery 12.

The door handles of the vehicle may have a movable element 94. This element is connected to terminals which actuate relay 96. If the driver leaves the car after locking the door, but finds he left some of the windows open, he can press the car door handle button 94, or its equivalent in vehicles which may be connected to switches similar to switch or relay 96. This energizes relay coil 96. The opposite end of relay 98 is connected to the positive side of the battery 12, and when the door button or its equivalent is in differently designed door handles is pressed it energizes the relay 98 causes the blade 100 of relay 98 to engage terminal 106. Blade 100 is connected to the blade 24 of the car door relay 22 and terminal 106 is connected to terminal 26, so that when the door handle button 94 is pressed, relay 62 ( and relay 64),. if the motor vehicle has four doors with power windows) is energized, causing the blades 66, 68, 74, and 76, described above to engage terminals 70, 72, 78, and 80 thereby closing all the vehicle windows. In this way the driver, after exiting the motor vehicle simply has to press door handle button 94 to simultaneously close all the windows in the vehicle.

In summary, it can be seen that all the windows in the motor vehicle close automatically when either the car door locking switch 16 is actuated or when the car door handle button 94 or its equivalent in vehicles with differently designed door handles is pressed. It is also noted that the built in window operating switches that are actuated when the window button 94 or its equivalent is pressed, raise the windows and are not affected by the operation of the door lock switch or the position of the ignition switch.

As stated above, although this invention is directed to a mechanism for closing all the windows in a vehicle, whenever the door lock switch is actuated or whenever the door handle button or its equivalent is actuated, the principles of this invention can be applied to motor homes or house trailer.

To this point, the windows being raised and lowered are described as powered by electric motors, and the electric switches and relays are connected to the electric motors so they raise the windows when either the electric door lock switch is actuated, or when the switch on the external vehicle door handle is actuated. It is also contemplated, that the windows could be raised and lowered by other mechanisms besides the conventional electric motors in the window doors. For example, a hydraulic system or an air pressure system could be installed in the doors so the operation of the door switch or the operation of an actuation device in the car door handle could raise the windows, just as with the electric motors and circuit described above.

Having described the invention what I claim as new is:

1. A vehicle having at least one door and windows, an electric power source, at least some of said windows having reversible motors connected to said electric power source and attached to said windows for raising and lowering them, at least one two position door lock switch connected to said electric power source, and to the doors in said vehicle for locking or unlocking them when the door lock switch is actuated, each window with the reversible electric motors connected to them having two window control switches connected to said electric power source and to said reversible motors to control the movement of said windows, one of said window control switches connected to said door lock switch in such a way that when said door lock switch is actuated to lock said doors, said window control switches close causing all the windows in the vehicle to rise to a closed position, said second window control switch independent of said door lock switch and having three positions arranged so when said second switch is moved to one position the windows close, and when said second switch is moved to a second position the windows open, and when said second switch is moved to a third position the windows stay in place, at least a part of the door handles of at least one door movable, said movable part of said door handle mechanically connected to a door switch, said door switch connected to said electric power source and by passing the ignition switch and the door lock switch, said door switch connected to said one position of said window control switches in such as way that when said movable portion of said door handle is actuated said door switch connected to the door handle is closed causing all the windows in the vehicle to rise to a closing position whereby if the operator of the vehicle has exited the vehicle and left any window open, said operator can actuate the movable part of the door handle to close all the windows in the vehicle.

2. A motor vehicle having a plurality of doors, at least some of the door having windows mounted therein capable of being raised and lowered, an electric power source, said windows having reversible motors mounted in the doors and connected to said electric power source and to said windows for raising or lowering them, at least one two position door lock switch independent of the ignition switch in the motor vehicle connected to said electric power source to the doors in said vehicle for locking and unlocking them when the door switch is actuated, each window with the reversible electric motors connected to them having two window control switches connected to said electric power source and to said reversible motors to control the movement of said windows, one of said window control switches connected to said door lock switch in such a way that when said door lock switch is actuated to lock said doors, said window control switches close causing all the windows in the vehicle to rise to a closed position, said second window control switch independent of said door lock switch and having three positions arranged so when said second switch is moved to one position the windows close, and when said second switch is moved to a second position the windows open, and when said second switch is moved to a third position the windows stay in place, at least a part of the door handles of at least one door movable, said movable part of said door handle mechanically connected to a door switch, said door switch connected to the electric power source bypassing the ignition switch in the motor vehicle and said door switch and connected to said one position of said window control switches in such a way that when said movable portion of said door handle is actuated said door switch connected to the door handle is closed causing all the windows in the vehicle to rise to a closing position whereby if the operator of the vehicle has exited the vehicle and left any window open, said operator can actuate the movable part of the door handle to close all the windows in the vehicle.

3. A motor vehicle having a plurality of doors, at least some of the door having windows movably mounted in the doors and having reversible motors in said doors connected to said electric power source and to said windows for raising and lowering them, at least one two position door lock switch independent of the ignition switch in the motor vehicle connected to said electric power source in said vehicle and the doors in said vehicle for locking and unlocking them when the door lock switch is actuated, each window with the reversible electric motors connected to them having two window control switches connected to said electric power source and to said reversible motors to control the movement of said windows, one of said window control switches connected to said door lock switch so that when said door lock switch is actuated to lock said doors, said window control switches move to the window up pole position causing all the movably mounted windows in the vehicle to rise to a closed position, said second window control switch independent of said door lock switch and said ignition switch and having three positions arranged so when said second switch is manually moved to the window up pole position the windows close, and when said second window control switch is manually moved to a window down pole position the windows open, and when said second switch is manually moved to a third position the windows stay in place, at least a part of the door handle of at least one door having a movable element, said movable element of said door handle mechanically connected to an electric switch, said electric switch connected to the electric power source and to said window up pole position in said first switch so that when said movable portion of said door handle is actuated said electric switch is closed causing all the windows in the vehicle to rise to a closed position whereby if the operator of the vehicle has exited the vehicle and left any window open, said operator can actuate the movable part of the door handle to close all the windows in the vehicle.

4. A motor vehicle having a plurality of doors, at least some of the door having windows movably mounted in the doors and having reversible motors in said doors connected to said electric power source and to said windows for raising and lowering them, at least one two position door lock switch independent of the ignition switch in the motor vehicle connected to said electric power source in said vehicle and the doors in said vehicle for locking and unlocking them when the door lock switch is actuated, each window with the reversible electric motors connected to them having two window control switches connected to said electric power source and to said reversible motors to control the movement of said windows, one of said window control switches comprising a three position switch independent of the ignition switch and the position of the doors in the motor vehicle, and connected to the power means, whereby when the window control switch is manually moved to a window up pole position the windows close, and when said window control switch is manually moved to a window down pole position the windows open, and when the window control switch is manually moved to a third position, the windows stay in place, a by pass switch connected between the door lock switch and the window up pole position of the three position switch so that when the door lock switch is closed the by pass switch closes completing the circuit to the window up position of the three position switch causing the windows to rise, said motor vehicle doors having external handles operable to open the doors of the motor vehicle, said external handles having a door opening button, said button having two functions in that said button is connected to both a door opening mechanism to open the door when the door when said button is pressed and said button connected to an electric switch so that the terminals of said switch close when said button is pressed, said electric switch independent of the ignition switch and connected to the window up pole position of the three position switch so that when the button is pressed, said switch is closed and the circuit between the electric motors and the window up pole position of the three position switch is completed causing the windows to rise, whereby if the operator of the motor vehicle has exited the vehicle and left any windows open said operator can press said button on the door handle to close all the windows in the motor vehicle.

5. A motor vehicle having a plurality of doors, at least some of the door having windows movably mounted in the doors and having reversible motors in said doors connected to said electric power source and to said windows for raising and lowering them, at least one two position door lock switch independent of the ignition switch in the motor vehicle connected to said electric power source in said vehicle and the doors in said vehicle for locking and unlocking them when the door lock switch is actuated, each window with the reversible electric motors connected to them having two window control switches connected to said electric power source and to said reversible motors to control the movement of said windows, one of said window control switches comprising a three position switch independent of the ignition switch and the position of the doors in the motor vehicle, and connected to the power means, whereby when the window control switch is manually moved to a window up pole position the windows close, and when said window control switch is manually moved to a window down pole position the windows open, and when the window control switch is manually moved to a third position, the windows stay in place, a by pass switch connected between the door lock switch and the window up pole position of the three position switch so that when the door lock switch is closed the by pass switch closes completing the circuit to the window up position of the three position switch causing the windows to rise, said motor vehicle doors having external handles operable to open the doors of the motor vehicle, said external handles having a movable element, said movable element connected to an electric switch, said electric switch independent of the ignition switch and connected to the window up pole position of the three position switch so that when said switch is closed, the circuit between the electric motors and the window up pole position of the three position switch is completed causing the windows to rise, whereby if the operator of the motor vehicle has exited the vehicle and left any windows open said operator can manually actuate the said movable element to close all the windows in the motor vehicle when said three position switch is in its neutral position.

6. A motor vehicle having a plurality of doors, at least some of the door having windows movably mounted in the doors and having reversible motors in said doors connected to said electric power source and to said windows for raising and lowering them, at least one two position door lock switch independent of the ignition switch in the motor vehicle connected to said electric power source in said vehicle and the doors in said vehicle for locking and unlocking them when the door lock switch is actuated, each window with the reversible electric motors connected to them having two window control switches connected to said electric power source and to said reversible motors to control the movement of said windows, one of said window control switches comprising a three position switch independent of the ignition switch and the position of the doors in the motor vehicle, and connected to the power means, whereby when the window control switch is manually moved to a window up pole position the windows close, and when said window control switch is manually moved to a window down pole position the windows open, and when the window control switch is manually moved to a third position, the windows stay in place, by pass means connected between the door lock switch and the window up pole position of the three position switch so that when the door lock switch is closed and the by pass means is actuated, it completes the circuit to the window up position of the three position switch causing the windows to rise, said motor vehicle doors having external handles operable to open the doors of the motor vehicle, said external handles having a movable element, said movable element connected to an electric switch, said electric switch independent of the ignition switch and connected to the window up pole position of the three position switch so that when said switch is closed, the circuit between the electric motors and the window up pole position of the three position switch is completed causing the windows to rise, whereby if the driver of the motor vehicle has exited the vehicle and left any windows open said driver can manually actuate the said movable element in said door handle to close all the windows in the motor vehicle when said three position switch is in its neutral position, said by pass means comprising a plurality of relays, each relay associated with a window control switch and including a movable blade, each blade connected to the positive side of the circuit and movable into engagement with the portion of the three position window control switch that raises the windows, said relays connected to the electrical door lock switch and to the electric switch mounted in the door handle so that when either the door lock switch or the electric switch actuated by the movable element in the door handle, said relays close and said movable blades connect power to the electric power means that controls the upward direction of the windows.

7. The motor vehicle described in claim 1 including means mounted in the windows in such a way that when the windows are raised to their uppermost or lowest position in the door frame said means opens and disconnects the electric power means from the ground to stop the reversible motors and prevent further movement of the windows.

* * * * *